(12) United States Patent
Natsev et al.

(10) Patent No.: US 6,751,363 B1
(45) Date of Patent: Jun. 15, 2004

(54) METHODS OF IMAGING BASED ON WAVELET RETRIEVAL OF SCENES

(75) Inventors: Apostol Ivanov Natsev, Durham, NC (US); Rajeev Rastogi, New Providence, NJ (US); Kyuseok Shim, Bedminster, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/371,112

(22) Filed: Aug. 10, 1999

(51) Int. Cl.$^7$ .................................................. G06K 9/54
(52) U.S. Cl. ....................... 382/305; 382/173; 382/190; 382/205; 382/209; 382/218; 382/225; 358/403; 707/3; 707/4; 707/6
(58) Field of Search ................................. 382/173, 181, 382/190, 197, 205, 209, 218, 219, 224, 225, 276, 278, 288, 305, 115, 116, 217, 281; 358/403; 707/1–10, 104.1

(56) References Cited

U.S. PATENT DOCUMENTS

| | | | | |
|---|---|---|---|---|
| 5,819,288 A | * | 10/1998 | De Bonet | 707/2 |
| 5,899,999 A | * | 5/1999 | De Bonet | 707/104.1 |
| 6,182,069 B1 | * | 1/2001 | Niblack et al. | 707/6 |
| 6,226,636 B1 | * | 5/2001 | Abdel-Mottaleb et al. | 707/4 |
| 6,240,423 B1 | * | 5/2001 | Hirata | 707/104.1 |
| 6,285,995 B1 | * | 9/2001 | Abdel-Mottaleb et al. | 707/3 |
| 6,347,313 B1 | * | 2/2002 | Ma et al. | 707/3 |
| 6,389,169 B1 | * | 5/2002 | Stark et al. | 382/225 |
| 6,389,417 B1 | * | 5/2002 | Shin et al. | 707/6 |
| 6,463,426 B1 | * | 10/2002 | Lipson et al. | 707/3 |

OTHER PUBLICATIONS

Remias, et al "Block–Oriented Image Decomposition and Retrieval in Image Databse Systems", IEEE, 1996, PP. 85–92.*

Carson, et al "Region–Based Image Querying", IEEE, 1997, PP. 42–49.*

Yue, et al "Texture Image Retrieval by Universal Classification for Wavelet Transform Coefficients", IEEE, PP. 220–223.*

Wang, et al "Wavelet–Based Image Indexing Techniques with Partial Sketch Retrieval Capability", IEEE, 1997, PP. 13–24.*

Servetto, et al "A Successively Refinable Wavelet–Based Representation for Content–Based Image Retrieval", IEEE, 1997, PP. 325–330.*

Eakins, et al "Similarity Retrieval of Trademark Images", IEEE, 1998, PP. 53–63.*

Deng, et al "An Efficient Low–Dimensional Color Indexing Scheme for Region–Based Image Retrieval", IEEE, Mar. 1999, PP. 3017–3020.*

Albuz, et al "Vector–Wavelet Based Scalable Indexing and Retrieval System for large color Image Archives", IEEE, Mar. 1999, PP. 3021–3024.*

* cited by examiner

*Primary Examiner*—Daniel G. Mariam
(74) *Attorney, Agent, or Firm*—Cohen, Pontani Lieberman & Pavane

(57) ABSTRACT

Methods of imaging objects based on wavelet retrieval of scenes utilize wavelet transformation of plural defined regions of a query image. By increasing the granularity of the query image to greater than one region, accurate feature vectors are obtained that allow for robust extraction of corresponding regions from a database of target images. The methods further include the use of sliding windows to decompose the query and target images into regions, and the clustering of the regions utilizing a novel similarity metric that ensures robust image matching in low response times.

16 Claims, 5 Drawing Sheets

| 2.5 | .5 | 2.5 | .5 |
|-----|----|----|----|
| 1 | 0 | 1 | 0 |
| 2.5 | .5 | 2.5 | .5 |
| 1 | 0 | 1 | 0 |

| | | .5 | .5 |
|--|--|--|--|
| | | .5 | .5 |
| 1 | 1 | 0 | 0 |
| 1 | 1 | 0 | 0 |

| 2.5 | 0 | .5 | .5 |
|-----|---|----|----|
| 0 | 0 | .5 | .5 |
| 1 | 1 | 0 | 0 |
| 1 | 1 | 0 | 0 |

METHODS OF IMAGING BASED ON WAVELET RETRIEVAL OF SCENES

BACKGROUND OF THE INVENTION

1. Field of the Invention

This invention relates generally to methods of content-based imaging. More specifically, the invention relates to content-based imaging effected by decomposing an image into a series of regions and extracting the image by comparing the regions to similar regions of stored images.

2. Description of the Related Art

Modern computers have developed increased processor speeds, improved graphics capabilities and advanced image processing which have all helped to make digital images easily viewable. The Internet has greatly proliferated the need for fast and accurate downloading of digital images and, consequently, applications requiring content-based querying and searching of images are now ubiquitous in data mining techniques, multimedia messaging, medical imaging, weather prediction, insurance, television production, satellite image databases and E-commerce applications, for example.

Traditionally, the retrieval of images that match a query image from a large database of images has heretofore been accomplished by computing a feature signature for each query image, mapping all signatures to d-dimensional points in some metric space, and building an index on all signatures for fast retrieval. In this method, an appropriate distance function, for example a Euclidean distance, is defined for each pair of signatures. Then, given a query, the index is used to locate signatures close to the query point. The set of images corresponding to the signatures, which constitutes the result of the query, are then returned.

Typical methods of computing signatures utilize color histograms to characterize the color composition of an image without regard to of its scale or orientation. The problem with color histograms, however, is that they do not contain any shape, location or texture information. As a result, two images with similar color composition may in fact contain very different shapes and thus be completely unrelated semantically. In order to alleviate this problem, prior imaging techniques define separate distance functions for color, shape and texture and subsequently combine them to derive the overall result. An alternate approach to solving this problem is to use the dominant wavelet coefficients for an image as its signature. Since wavelets capture shape, texture and location information in a single unified framework, their use tends to ameliorate some of the problems associated with prior imaging algorithms.

The above-mentioned schemes for imaging typically do not work well since they compute a single signature for the entire image. As a result, they usually fail when images contain similar objects having different locations and/or varying sizes. These algorithms simply fail with respect to scaling and translation of objects within images because a single signature computed for the whole image cannot sufficiently capture the important properties of individual objects. It would therefore be desirable to provide a system that is more robust with respect to resolution changes, dithering effects, color shifts, orientation, size and location for the whole image as well as for individual objects within the whole image.

Other segmentation strategies for decomposing images into their individual objects have been proposed. Approaches that involve manual extraction of regions from an image are extremely time-consuming and are therefore impractical for large image collections. Thus, most prior image segmentation techniques rely on being able to identify region boundaries, sharp edges between objects, and a number of other factors such as color, shape and connectivity. Besides being computationally expensive, these techniques are frequently inaccurate in identifying objects and are generally not robust with respect to object granularity. Since the definition of an object is largely subjective, a single method cannot successfully identify the correct objects for all applications and usually decomposes what the user of the system perceives as a single object into several smaller objects. Moreover, these kinds of image segmentation techniques utilize domain-specific constraints and are, at best, application specific.

There accordingly exists long-felt, but unfulfilled, needs in the art for imaging techniques that can resolve images across a wide spectrum of image domains. These methods should be computationally efficient and able to resolve images containing similar objects at different locations and of varying sizes. It would also be desirable if such imaging techniques and methods were robust with respect to resolution changes, dithering effects, color shifts, orientation, size and location both with regard to the entire image as well as individual objects within the image. Such results have not heretofore been achieved in the art.

SUMMARY OF THE INVENTION

The aforementioned long-felt needs are met, and problems solved, by the methods of imaging objects provided in accordance with the present invention. The inventive methods improve on prior imaging techniques by increasing the granularity of the query image, constructing multiple signatures based on multiple regions of the query image, and applying a wavelet transformation to the multiple regions to decompose the signatures into feature vectors or sets that can be matched to multiple regions of target images. This allows fast and robust decorrelation of the data in the regions which causes the algorithms that implement the methods of the present invention to be computationally efficient.

In a preferred embodiment, the inventive methods utilize Haar wavelets to compute the feature signatures of the regions since they efficiently represent functions as a coarse overall approximation together with detail coefficients that influence the function at various scales. Haar wavelets have been found to be the fastest to compute and therefore speed up the overall computation tasks of the inventive methods. Other wavelet representations are also usable in accordance with the present invention, but the inventors have found that Haar wavelets provide the best image matching results in a computationally acceptable amount of time.

Methods of imaging based on wavelet retrieval of scenes disclosed and claimed herein efficiently and effectively compute fixed-size, low-dimensional feature signatures independent of resolution, image size and dithering effects. The inventive methods are computationally inexpensive and so can be run with the appropriate software on general purpose digital computers. Additionally, the algorithms that implement wavelet retrieval in accordance with the invention are very fast as compared to prior imaging techniques and are able to differentiate and image objects containing complex colors, textures and shapes, as well as multiple images within an object. Such results have not heretofore been achieved in the art.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar elements throughout the views:

FIGS. 4A, 4B and 4C illustrate a method for wavelet transformation after wavelet signatures are obtained in accordance with the present invention; and FIGS. 5A, 5B and 5C depict two graphs which compare the dynamic imaging algorithms of the present invention to prior art imaging algorithms as a function of execution time.

DETAILED DESCRIPTION OF THE PRESENTLY PREFERRED EMBODIMENTS

Figure 1:
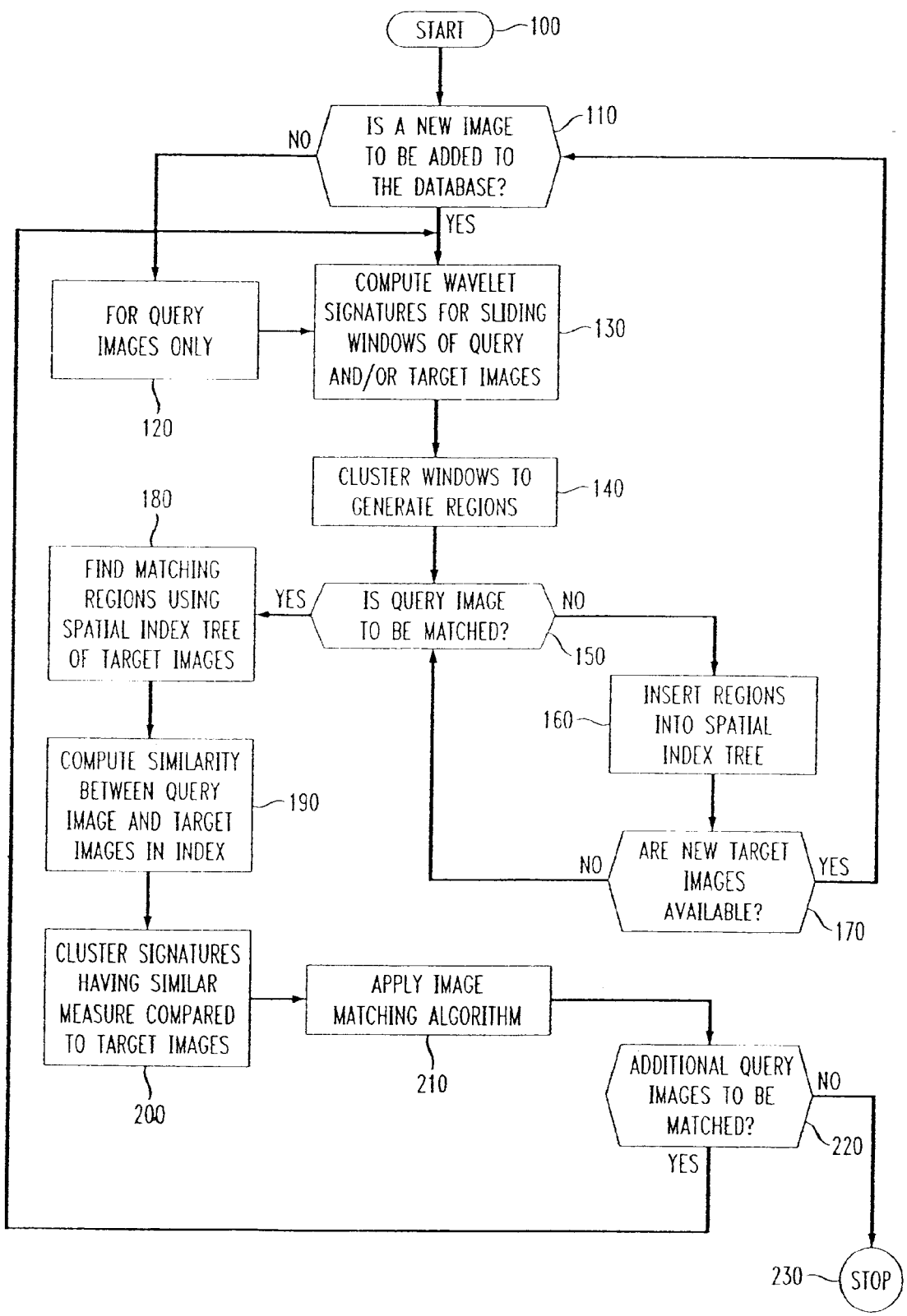
FIG. 1 is a flow chart of a preferred method of building a target image database and extracting query images in accordance with the invention.

The imaging methods of the present invention will typically be implemented in the form of appropriate software programs executable on a general purpose, digital computer to carry out the methods of the invention, described herein in conjunction with the exemplary flow chart shown in FIG. 1. Software programs for performing imaging in accordance with the invention and based on wavelet retrieval of scenes have been written in C++ computer code, but it will be recognized by those skilled in the art that any particular computer code, as for example Visual Basic, may also be used to program the imaging methods of the invention. The methods start at step 100 and, at step 110, it is determined whether a new database is to be populated with target images or whether new target images are to be added to the existing database. As used herein, the term "target image" denotes an image that will be stored in a database library of images and compared to query images to determine the similarity of the query images to the target images. When query images are "similar" to one or more of the target images in the database, the method is said to have "matched" the query image to a target image or images, thereby identifying the query image. A "query image" as used herein is simply an unknown image which will be identified by the inventive methods. The concepts of "similarity" and "matching" in accordance with the invention will be discussed in greater detail below.

It is desired to first build a database of target images to which the various query images can be compared in order to identify and extract the query images. The process of building the target database and index of target images is very similar to the process of identifying query images in the practice of the methods of the present invention. If at step 110 no new images are to be added to the database of target images, then at step 120 the methods proceed with data reduction only for the query images. However, if new images are to be added to the target database at step 110, then at step 130 data reduction occurs for both the target and query images independently. For illustrative purposes herein but without intending to limit the invention, it will to facilitate this description be assumed that the obtaining of wavelet signatures is undertaken by the inventive methods for both target and query images, unless otherwise stated.

At step 130, it is desired to compute wavelet signatures for sliding windows of the images. A "sliding window", as described in greater detail below, is a consequence of using a wavelet construct of an image wherein the first few wavelet coefficients serve as an effective signature for a window of data associated with the image. In accordance with the inventive methods, wavelet constructs are utilized for multiple regions of the image which give the image sufficient granularity to construct an accurate representation of the objects in the image to obtain good resolution and fast identification of the objects. By building a set of a variable number of signatures for an image, one for each region in the image, instead of obtaining a single signature for the entire image as was accomplished by prior art methods of imaging, accurate image extraction can be performed quickly.

Generally, a wavelet representation of a function consists of a coarse overall approximation of the image together with detail coefficients of the image that influence the function at various scales, i.e. at data windows across the function. Wavelet transforms typically have excellent energy compaction and decorrelation properties which can be used to effectively generate compact window representations that exploit the structure of the data. The inventive methods utilize wavelet subband decomposition and store only the most important subbands that are the top coefficients of the function. This allows the computation of fixed-size, low-dimensional feature vectors that are independent of image size, resolution and dithering effects. Wavelets are advantageously robust with respect to color and intensity shifts in that they do not lose resolution with small losses of data. Moreover, wavelets desirably capture both texture and shape information efficiently, and can be computed in linear time, thus allowing for the development of fast algorithms.

At step 140, the signature windows are "clustered" based on the proximity of their signatures to one another, wherein each "cluster" is considered a region and the centroid of all of the signatures in the cluster is the representative signature for the region. Alternatively, each region may be indexed by bounded boxes that group closely spaced regions. Regions of an image may also overlap one another. At step 150 it is then determined whether a query image is to be matched to the target images in the database. If not and it is merely necessary to update the database with new target images, then at step 160 the target images are inserted into a spatial index tree which is simply a relational database with indexing capabilities. Heretofore, a disk-based spatial index has been used to store the target images. It will be recognized by those skilled in the art that any commercial relational database can be used as the spatial index tree such, for example, as Lotus Notes, available from the Lotus Development Corporation of Cambridge, Mass.

After the new target image has been indexed and stored it is determined at step 170 whether other target images must be computed and stored in the database. If so, then the process for target images returns to and repeats step 110. If not, then it is preferable to return to step 150 where the matching routine for query images in accordance with the invention can be undertaken at step 180. At this point in the method depicted by FIG. 1, data manipulation and matching occurs exclusively on query images as compared to the corpus of target images found in the database previously constructed.

Next at step 190, the "similarity" between the query image and the target images in the database is computed. In accordance with the inventive methods, intuitive notions of similarity are employed to perform matching. Although similarity models have been used in the past to image objects, they are different from the similarity computations performed in accordance with the present invention. Prior art similarity models compute a single signature for each image based on color histograms, texture information or the top coefficients of the wavelet decomposition of the image. The degree of similarity between a pair of images is then typically defined in terms of the distance between their two signatures. However, since prior art similarity models are based on the proximity between the signatures computed at the image granularity level, they break down when a pair of images match only partially or contain matching regions whose locations may be different in the two images. The inventive methods overcome these difficulties, particularly when images contain similar regions but the region in one image is a translation or scaling of the matching region in the other.

In order to achieve these salutary results, the methods of the present invention compute and compare signatures at the granularity level of regions of the image, not at the granularity level of the entire image itself. The "similarity measure" between a pair of images, i.e. the query image and the potential target images in the database, is defined in terms of the fraction of the area covered by matching regions of the two images. This similarity metric greatly enhances the effectiveness of image retrieval and has not heretofore been known or used in the art.

A more succinct mathematical definition of this similarity metric is that a pair of regions is considered to be "similar" if the signature of one region lies within an envelope of $\epsilon$ width around the other. When bounding boxes are used as signatures for regions rather than centroids, two regions are defined to be similar if the bounding rectangle for one after extending it by a distance $\epsilon$ overlaps with the rectangle of the other.

In mathematical terms, for images Q (Query) and T (Target), the set of ordered pairs $\{(Q_1; T_1); \ldots ; (Q_l; T_l)\}$ is referred to as a similar region pair set for Q and T if $Q_i$ is similar to $T_i$ and for $i \neq j$, $Q_i \neq Q_j$, $T_i \neq T_j$. Then two images Q and T are said to be similar if there exists a similar region pair set for Q and T $\{(Q_1; T_1); \ldots ; (Q_1; T_1)\}$ such that:

$$\frac{area(U_{i+1}^l(Q_i)) + area(U_{i=1}^l(T_i))}{area(Q) + area(T)} \geq \varepsilon$$

In the above formulation, area $(U^1_{i=1}(Q_i))$ is the number of pixels in Q covered by regions $(Q_1; \ldots Q_1)$ considered together. Thus, two images are considered to be similar if the fraction of match area compared to the total area of the two images is above the user-specified threshold $\epsilon$. Note that depending on the application, other variations for the similarity measure between images can be devised. One such variation is to simply measure the fraction of the query image Q covered by matching regions in Q. For images of different sizes, another is to use twice the area of the smaller image in the denominator instead of the sum of the areas of the two images. Those skilled in the art will recognize that other variations of the definition of similarity may be employed, at least in part as a function of the types of images to be matched, their sizes and the desired imaging application.

Note also that in the above definition of similar region pair sets, it is explicitly required that $Q_i \neq Q_j$, that is, that no two regions are the same. This restriction is imposed to prevent a situation in which the same region from one image matches several non-overlapping regions from the other and thus causes the matching fraction of the area to exceed the threshold $\epsilon$. Of course, if for an application this is not a problem; the restriction that the regions in a similar region pair set be distinct can then be relaxed.

At step 200, it is then desired to cluster the signatures having the same similarity measure as compared to target images in the database. An image matching algorithm is next applied at step 210, as will be described in more detail below. If at step 220 additional query images are presented and must be matched, the method returns to step 130 where the process begins again. Otherwise, the method terminates at step 230.

In order to compute wavelet signatures in accordance with the present invention (step 130), it is preferable to employ a Haar wavelet transformation, although other wavelet transformations may also or alternatively be used. Haar wavelets are preferably employed in the inventive methods since they are the fastest to compute and have been found to retrieve images accurately and efficiently. Haar wavelets are taught and disclosed in C. E. Jacobs, A. Finkelstein, and D. H. Salesin, "Fast Multiresolution Image Querying", Proc. of SIGGRAPH 95, Annual Conference Series, pp. 277–286 (August 1995), the teachings of which are expressly incorporated herein by reference.

To illustrate the manipulation of a Haar wavelet, consider the one-dimensional case where a pixel image has the following four values:

I=[2, 2, 5, 7].

The Haar wavelet transformation for the above image is calculated by averaging the values together pairwise to yield a new, lower resolution image with the following average values:

[2, 6].

That is, the average of the first two values (2, 2) is 2, and the average of the last two values (5, 7) is 6. Some information is lost due to this averaging, and so to restore the original four values of the image some detail coefficients are needed that capture the missing information. In a Haar wavelet, the difference of the second of the averaged values from the average value itself constitutes the detail coefficients. Thus, for the first pair of averaged values, the detail coefficient is 0 since 2−2=0, while for the second it is 1 since 7−6=1. By repeating this process recursively on the lower resolution image containing the averages, it is possible to obtain the full decomposition as follows:

| RESOLUTION | AVERAGES | DETAIL COEFFICIENTS |
| --- | --- | --- |
| 2 | [2, 2, 5, 7] | — |
| 1 | [2, 6] | [0, 1] |
| 0 | [4] | [2] |

The wavelet transform for the original image with four pixels is defined as the single coefficient representing the overall average of the pixel values followed by the detail coefficients in the order of increasing resolution. Thus, the one-dimensional Haar wavelet transform for the original image is given by:

I'=[4, 2, 0, 1].

Each entry in I' is called a wavelet coefficient. Using the wavelet transform of an image rather than the image itself has a number of advantages. One such advantage is that a large number of the detail coefficients tend to be very small values. Truncating these small values from the transform introduces only small errors in the reconstructed image, thereby yielding a form of "lossy" image compression.

The wavelet coefficients in the above example carry different weights with respect to their importance to the reconstructed image. For example, the overall average of the whole data set is more important than any of the detail coefficients because it affects the entire range of reconstructed values. In order to equalize the importance of all coefficients, the final wavelet coefficients must be normalized appropriately. Normalization is achieved by dividing each wavelet coefficient by $\sqrt{2^i}$, where i denotes the index of the approximation level in which the coefficient appears (where level 0 is the finest resolution level). Thus, the wavelet transform for the previous example becomes, after normalization:

$$I'=[4,2,0,1/\sqrt{2}]$$

There are two preferred methods in accordance with the invention, by which wavelets can be used to transform the pixel values in a two-dimensional image. Each of these transforms is a two-dimensional generalization of the one-dimensional wavelet transform described above. The first is called "standard decomposition." In this method, the one-dimensional wavelet transform is first applied to each row of pixel values; this operation produces an average value along with detail coefficients for each row. Next, these transformed rows are treated as if they were themselves an image and the one-dimensional transform is applied to each column; the resulting values are all detail coefficients except for a single overall average coefficient.

The second, more preferred transform is called "non-standard decomposition." In this method, one step of horizontal pairwise averaging and differencing is performed on the pixel values in each row of the image. Next, vertical pairwise averaging and differencing is applied to each column of the result. This process is repeated recursively only on the quadrant containing averages in both directions.

The procedure for computing the wavelet transform W for a w×w image I using non-standard decomposition is illustrated below in C++ code, although it will be apparent that other computer languages may instead be used:

1. for $i = 1$ to $\frac{w}{2}$ do
2. for $j = 1$ to $\frac{w}{2}$ do{
3. $A[i, j] := (I[2i-1, 2j-1] + I[2i, 2j-1] + I[2i-1, 2j] + I[2i, 2j])/4$
4. $W\left[\frac{w}{2}+i, j\right] := (-I[2i-1, 2j-1] + I[2i, 2j-1] - I[2i-1, 2j] + I[2i, 2j])/4$
5. $W\left[i, \frac{w}{2}+j\right] := (-I[2i-1, 2j-1] - I[2i, 2j-1] + I[2i-1, 2j] + I[2i, 2j])/4$
6. $W\left[\frac{w}{2}+i, \frac{w}{2}+j\right] := (-I[2i-1, 2j-1] - I[2i, 2j-1] - I[2i-1, 2j] + I[2i, 2j])/4$
7. }
8. if $w>2$
9. computeWavelet$\left(A, W, \frac{w}{2}\right)$
10. else
11. $W[1, 1] = A[1, 1]$
end In applying the non-standard decomposition method of the present invention in a square coordinate system, the coordinate of the upper left corner pixel of I is [1,1], the lower left corner pixel is [1, n] and the upper right corner pixel is [n, 1]. Each horizontal, followed by vertical, pairwise averaging and differencing involves pixels in the 2×2 box rooted at coordinates [2i−1,2j−1] for $1 \leq i, j \leq w/2$. The horizontal and vertical averaging of pixels in each 2×2 box rooted at [2i−1,2j−1] results in 4 new pixel values and these are computed in program Steps 3–6 above. The upper left value (computed in Step 3) is the average of the 4 pixel values and is stored in a new $w/2 \times w/2$ temporary matrix A whose primary purpose is to store averages on which the above averaging and differencing process is to be recursively applied. The remaining 3 new pixel values denoting the upper right (Step 4), lower left (Step 5) and lower right (Step 6) pixels are assigned to pixel [i, j] in the upper right, lower left and lower right $w/2 \times w/2$ quadrants of W, respectively; these are the detail coefficients. Once the averages for all of the 2×2 boxes have been computed, the compute-Wavelet procedure is recursively invoked on A in Step 9, which is simply a subroutine that computes the Haar wavelets in a manner similar to that performed above. Note that the size of A is $w/2 \times w/2$ —thus, if w=2 then A has a single average value which is the average value of all of the pixels in I and is thus assigned to W[1,1] in Step 11. As mentioned above, to normalize the coefficients for the one-dimensional Haar transform, the coefficients in the i-th band are divided by $\sqrt{2^i}$. For the two-dimensional Haar transform, this factor becomes $2^i$.

Figure 2A:
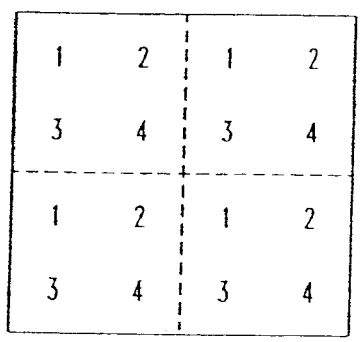
FIGS. 2A and 2B illustrate computation of a Haar wavelet transform for use in wavelet retrieval of scenes in accordance with the present invention.
Figure 2B:
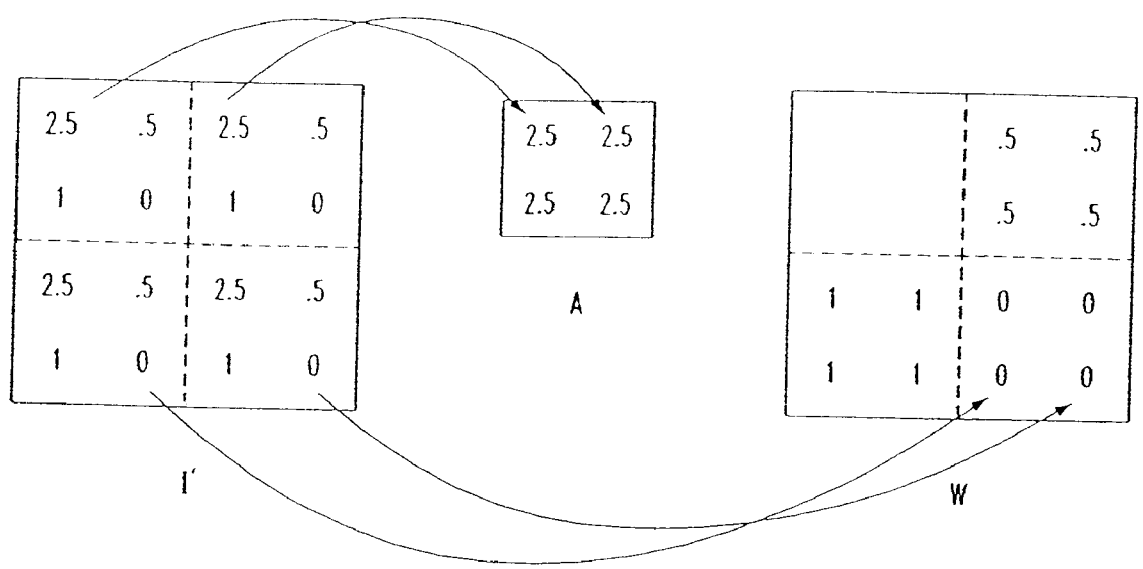

Referring now to FIGS. 2A and 2B, an 8×8 image I is there shown and the non-standard decomposition method is applied. The matrix I' is the result of the first horizontal and vertical pairwise averaging and differencing on the 2×2 boxes of the original image. The average 2.5 of the values in each box is assigned to the 2×2 matrix A, while the detail coefficients are stored in the three 2×2 quadrants of the W matrix. The process is then recursively performed a second time on the averages contained in the A matrix, resulting in detail coefficients of 0 and an average value of 2.5, which is stored in the upper-left corner pixel of the W matrix.

To begin the actual imaging process in accordance with the invention, in the first instance each image is broken into sliding windows (step 130 of FIG. 1) (which may overlap) with different sizes ranging from $w_{min} \times w_{min}$ to $w_{max} \times w_{max}$. As the signature for each window, the $s^2$ coefficients are used from the lowest frequency band of the Haar wavelet transform for the window—that is, the s×s matrix at the upper left corner of the wavelet transform for the window.

To cluster the sliding windows (step 140) in the image, the Euclidean distance between their respective signatures is preferably used as the distance metric. Each cluster thus contains a set of similar windows which together define a region. The centroid of the cluster can be used as the signature for the region; alternately, the bounding box of all signatures in the cluster can be used as the signature as mentioned above. The query image is thereby decomposed into a number of regions.

To perform region matching (step 180), for each region of the query image a spatial index is used to find all regions in the database that are similar—, that is, regions whose signatures are within ε distance of a region of the query. As mentioned above, any database may be used to index the regions. In the preferred embodiment, the R*-tree spatial index (to be described in further detail below) is utilized for spatial indexing and building of the target database. In the image indexing phase, the regions of each image in the database computed in the previous step are preferably indexed using their signatures.

The previous step computes all of the pairs of matching regions $(Q_i,T_1)$ for the query image Q and each target image T in the database. This information is used to compute the best similar region pair set for Q and T, i.e. the one that covers the maximum area in the two images and thus maximizes the similarity measure between Q and T as defined above, thereby matching Q to T. It should be noted that for target images T whose similarity to Q exceeds the threshold, steps 1–4 can be repeated with more detailed signatures (that is, by retaining a larger number of coefficients from the wavelet transform) to further improve the quality of matching.

In accordance with the inventive methods, a dynamic programming algorithm to efficiently compute wavelet signatures for sliding windows in an image has been developed. This algorithm has similarly been implemented in C++ code, although any programming language can be used. An image is a two dimensional array of pixel values. Images can be represented using a number of different color spaces: i.e. RGB, HSV and YIQ, each of which store 3 color components for every pixel. The dynamic algorithm of the present invention for a single color value per pixel is described below, and the extension of the algorithm to multiple color channels is straightforward.

The time complexity of computing the wavelet decomposition for a window is linear in the number of pixels in the window. That is, for a square window of width w, the complexity of computing the wavelet coefficients is $O(w^2)$ For an $n_1 \times n_2$ image and window size of w, the total number of windows in the image is $(n_1-w)(n_2-w)$. Thus, the complexity of naively computing wavelet coefficients of windows rooted at every pixel in the image becomes $O(w^2(n_1-w)(n_2-w))$, which could be prohibitive. Instead, in accordance with the inventive methods, the dynamic programming algorithm incrementally computes the coefficients for larger windows using those computed for smaller windows, thereby reusing the computations performed for smaller windows. In particular, and assuming computed signatures for windows of size $w/2 \times w/2$, it is possible to compute signatures for windows of size w×w using the signatures of the smaller windows of size $w/2 \times w/2$.

Figure 3A:
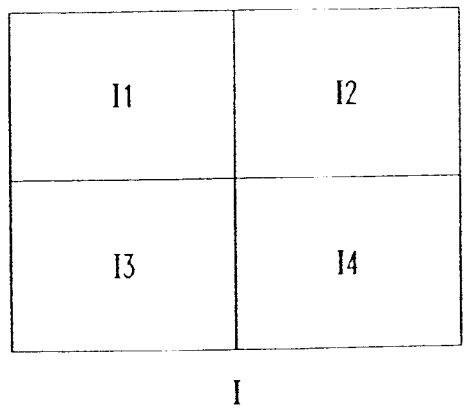
FIGS. 3A, 3B and 3C illustrate computation of image signatures for windows in an image.
Figure 3B:
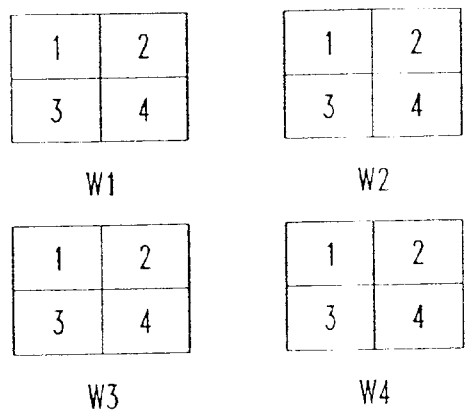
Figure 3C:
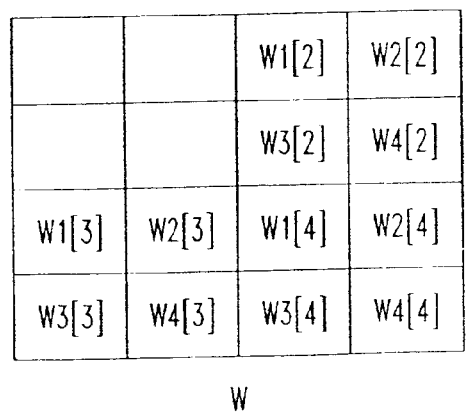

The algorithm can be visualized graphically by first referring to FIGS. 3A, 3B and 3C in which the process for computing a wavelet transform W for a single window is depicted. Let I (FIG. 3A) be the w×w window whose wavelet transform W it is desired to compute and let $I_1$, $I_2$, $I_3$ and $I_4$ denote the four smaller $w/2 \times w/2$ windows contained therein. Further, let $W_1$, $W_2$, $W_3$ and $W_4$ (FIG. 3B) be the wavelet transforms for $I_1$, $I_2$, $I_3$, and $I_4$.

Consider a further decomposition of each of $W_1$, $W_2$, $W_3$ and $W_4$ into quadrants, and label them by 1, 2, 3 and 4, as shown FIG. 3C. The quadrants 2, 3 and 4 denote the upper right, lower left and lower right detail coefficients generated by the first round of horizontal and vertical averaging and differencing on pixels in each of $I_1$, $I_2$, $I_3$ and $I_4$ by the computeWavelets procedure described above for Haar wavelets. Thus, were the computeWavelets procedure applied to I, then after the first round of averaging and differencing, the detail coefficients in the upper right, lower left and lower right quadrants of W would have values as shown in the right hand matrix. Simply stated, the detail coefficients in each quadrant of W are a combination of the detail coefficients from the corresponding quadrant of each of $W_1$, $W_2$, $W_3$ and $W_4$.

Assume now that A is the $w/2 \times w/2$ matrix of average values of 2×2 boxes of pixels in I after the first round of averaging and differencing. Thus, the upper left quadrant of W is A, and A consists of averages of 2×2 boxes from $I_1$, $I_2$, $I_3$ and $I_4$ after the first round of averaging. Then, since quadrant 1 in each of $W_1$, $W_2$, $W_3$ and $W_4$ are the wavelet transforms of the averages of 2×2 boxes in $I_1$, $I_2$, $I_3$ and $I_4$, respectively, after the first round of averaging, $W_1[1], \ldots, W_4[1]$ are the wavelet transforms for the four quadrants of A. Since the upper left quadrant of W is the wavelet transform for A, it is simply necessary to repeat the earlier steps with $W_1[1]$, $W_2[1]$, $W_3[1]$ and $W_4[1]$ as the wavelet transforms quadrants that comprise A and the upper left quadrant of W as the target where the wavelet transform for A is to be stored.

The above-described recursive process terminates when $W_1[1]$, $W_2[1]$, $W_3[1]$ and $W_4[1]$ each contain only a single value which is the average of all of the pixel values in $I_1$, $I_2$, $I_3$ and $I_1$, $I_2$, $I_3$ and $I_4$, respectively. At this point, values for the four upper left pixels of W, $W_1[1,1]$, $W_2[1,2]$, $W_3[2,1]$ and $W_4[2,2]$ can be computed by performing vertical averaging over the four averages in $W_1[1], \ldots, W_4[1]$ as described in the computeWavelets procedure.

FIGS. 4A through 4C, depict the wavelet transforms for the four quadrants of I. In accordance with the inventive methods, the wavelet transform W for I is computed from the wavelet transforms for its four quadrants. First, the detail coefficients are obtained for the three non-upper left quadrants of W by copying them from their respective positions in the four smaller quadrants as described with respect to FIG. 3A through 3C. W is shown in FIG. 4B. The coefficients in the upper left quadrant of W are then computed from the average values for pixels in each of the four quadrants (stored in the upper left corner pixel of each quadrant), and the resulting W is shown in FIG. 4C.

The procedure for computing the wavelet transform for a w×w window from the wavelets for its four subwindows is shown below in the C++ programming language:

procedure computeSingleWindow ($W_1$, $W_2$, $W_3$, $W_4$, W, w)

begin 1. if w = 2{
2. $W[1, 1] := (W_1[1, 1] + W_2[1, 1] + W_3[1, 1] + W_4[1, 1])/4$
3. $W[2, 1] := (-W_1[1, 1] + W_2[1, 1] - W_3[1, 1] + W_4[1, 1])/4$
4. $W[1, 2] := (-W_1[1, 1] - W_2[1, 1] + W_3[1, 1] + W_4[1, 1])/4$
5. $W[2, 2] := (W_1[1, 1] - W_2[1, 1] - W_3[1, 1] + W_4[1, 1])/4$
6. return
7. }
8. copy Blocks ($W_1$, $W_2$, $W_3$, $W_4$, W, w)
9. computeSingleWindow $\left(W_1, W_2, W_3, W_4, W, \frac{w}{2}\right)$ end.

The terms $W_1$, $W_2$, $W_3$ and $W_4$ are the wavelet coefficients for the four w×w subwindows of the window whose wavelet transform it is desired to compute, and w is the target for the computed wavelet coefficients for the w×w window. If w is 2, then in steps 2–5, it is preferable to perform horizontal and vertical averaging and differencing on the upper left pixel of each of $W_1$, $W_2$, $W_3$ and $W_4$. Otherwise, the copyBlocks procedure of step 8 above is invoked which copies the upper right, lower left and lower right quadrants of $W_1$, $W_2$, $W_3$ and $W_4$ to the corresponding quadrants of W as described with respect to FIG. 3. The procedure then calls itself recursively to compute the coefficients for the upper left $w/2 \times w/2$ quadrant of W using the coefficients in the upper left $w/2 \times w/2$ quadrants of $W_1$, $W_2$, $W_3$ and $W_4$.

It should be noted that since only the s×s signature for each window is of interest, it is only necessary to compute coefficients for the upper left s×s matrix of W. From the foregoing discussion on the computation of the wavelet transform for a single window, it follows that this can be computed by recursively invoking the copyBlocks procedure on the s/2×s/2 upper left coefficients of the wavelet transform for the four subwindows in the window. Thus, invoking procedure computeSingleWindow with w=s computes the upper left s×s wavelet matrix for W with the upper left s/2×s/2 wavelet matrices of its four subwindows $W_1$, $W_2$, $W_3$ and $W_4$ as the starting point.

The procedure computeSingleWindow computes the wavelet signature for a single window. Dynamic programming methods of the present invention compute signatures for multiple sliding windows in an $n_1 \times n_2$ image. A procedure called computeSlidingWindows of the present invention computes s×s signatures for all sliding windows in an image whose sizes are a power of 2 and do not exceed $w_{max}$. Procedure computeSlidingWindows also accepts as an input parameter the number of pixels t by which to slide each window, where t is the horizontal/vertical distance between the upper left pixels of any two adjacent windows. The parameters s, $w_{max}$ and t are all required to be powers of 2. This procedure, in C++, is as follows:

procedure ComputeSlidingWindows s, $w_{max}$, t
begin 1. for each $w \in [2, w_{max}]$ and that is a power of 2 do{
2. $dist := w_{max}(w, t)$
3. for $i = 0$ to $\frac{n_1 - w}{dist}$ do
4. for $j = 0$ to $\frac{n_2 - w}{dist}$ do{
5. $x := i^*dist + 1$
6. $y := j^*dist + 1$
7. $computeSingleWindow \left( W^{\frac{w}{2}}[x, y], W^{\frac{w}{2}}\left[x + \frac{w}{2}, y\right], \right.$
   $W^{\frac{w}{2}}\left[x, y + \frac{w}{2}\right],$
8. $\left. W^{\frac{w}{2}}\left[x + \frac{w}{2}, y + \frac{w}{2}\right], W^w[x, y], \min(w, s) \right)$
9. } end.

In a single iteration of the outermost loop in Step 1, wavelet signatures are computed for all w×w windows in the image. In each successive iteration, w is doubled, beginning with an initial value of 2 for w until it reaches the maximum window size $w_{max}$. The wavelet signature for a window of size w and whose upper left pixel is at [i, j] is stored in $W^w[i, j]$. The wavelet signature for each w×w window is computed using those computed in the previous iteration for the four $w/2 \times w/2$ subwindows in it. $W^w[i, j]$ for every 1×1 window rooted at pixel [i, j] is initialized to the value of the pixel [i, j] (that is, the raw image intensity at a pixel is the signature for the 1×1 window containing the pixel).

In Step 2, dist, the distance between any two successive sliding windows is set to be the minimum of t and the window width w; this is for alignment purposes and to ensure that for any w×w window, the wavelet signatures for its four $w/2 \times w/2$ subwindows have been computed in the previous iteration. In order to show that this is indeed the case, consider two cases: if $w \leq t$ then dist is w and, during the previous iteration, dist must have been $w/2$. Thus, it follows that wavelet signatures for all windows comprising the window would have been computed in the previous iteration. On the other hand, if w>t, then dist is the same during the previous iteration and the current iteration, and is equal to t. Since t and w are both multiples of 2, it follows that $w/2$ is a multiple of t and therefore the wavelet signatures for the four $w/2 \times w/2$ windows would have been computed in the previous iteration.

In an $n_1 \times n_2$ image, there are $$\frac{n_{1-w}}{dist} + 1$$

possible w×w windows at a distance dist apart and rooted at a single row of pixels; similarly there can be $$\frac{n_{2-w}}{dist} + 1$$

windows rooted at a single column of pixels. Thus, for the loops of steps 3 and 4, the coordinates [x, y] for the upper left corner pixel for each window is varied from 1 to $n_1 - w + 1$ at increments of dist in the horizontal direction, and from 1 to $n_2 - w + 1$ with increments of dist in the vertical direction. Finally, in Step 7, the procedure computeSingleWindow is invoked to compute the signature for the w×w window rooted at [x, y] from signatures for its four $w/2 \times w/2$ subwindows and the size of the signature to be computed, min (w, s), is passed as a parameter.

Therefore, to generate signatures for all windows with sizes that are a power of 2 and range from $w_{min} \times w_{min}$ to $w_{max} \times w_{max}$, passing $w_{max}$ as the input parameter to the dynamic programming algorithm generates all of the desired signatures. It will be noted that signatures for windows whose size w is less than $w_{min}$ can be deleted once they have been used to compute the signatures for windows of size 2w.

The number of windows of size w×w for which wavelet signatures are computed during a single iteration of the procedure computeSlidingWindows is $$\left(\frac{n_1 - w}{\min\{w, t\}} + 1\right)\left(\frac{n_2 - w}{\min\{w, t\}} + 1\right).$$

Furthermore, $O(s^2)$ operations are required to compute the s×s wavelet signature for each window. The computation of most of the signature coefficients simply involves simply copying them from the signature computed for a window of width $w/2$. Only the four lowest band coefficients require pairwise averaging and differencing to be performed. Thus, the overall time complexity of computing signatures for windows of a given w is O(NS), where $N = n_1 n_2$ and $S = s^2$.

Since it is desired to compute signatures for $\log_2 w_{max}$ window sizes ranging from 2 to $w_{max}$, the overall time complexity of computing signatures for all of the sliding windows is $O(N\ S\ \log_2\ w_{max})$.

For each window, it is further desired to obtain a two-dimensional array of size s×s to store its signature. Thus, for all windows of a size w, N*S memory is needed where $N=n_1 n_2$ and $S=s^2$. The computation of the signature for a new, bigger window requires just the previously computed signatures for smaller subwindows. Consequently, signatures are needed for only two consecutive window sizes need to fit in main memory for the purpose of efficiently computing signatures without incurring disk I/O. The total memory space requirements for the dynamic programming algorithm of the present invention is therefore 2N*S.

The memory requirements to compute signatures for windows can actually be reduced from 2N*S to simply N*S. It will be recognized that each window of size $w/2 \times w/2$ participates in the computation of signatures for exactly four windows of size w×w (except near the image borders). Moreover, if windows are processed from top to bottom, and left to right, then when computing $W^w[i,j]$ the three other w×w windows that use $W^2[i, j]$ have already been processed and $W^{w/2}[i, j]$ can therefore be deleted once $W^w[i, j]$ has been computed. The total auxiliary memory space required by the procedure computeSlidingWindows thus advantageously becomes exactly N*S.

One other way to compute the wavelet signatures for all windows of a given size w is to first compute all of the wavelet coefficients for each window and then truncate the higher frequency bands that are not of interest. This is a so called "naive" algorithm whose strength is its reduced memory requirements which come about from processing one window at a time so that only enough memory to store the wavelet transform for a single window of size $w^2$ is needed. Thus, the prior art naive algorithm requires only $w^2$ memory space as compared to the N*S space required by the dynamic programming algorithm. However, the time complexity of the naive algorithm can be much higher since computing the wavelet transform of each w×w window requires $O(w^2)$ operations and there are $O(N)$ such windows. Thus, the overall time complexity of the naive algorithm is $O(Nw^2_{max})$ which can be much worse than the $O(NS\log_2 w_{max})$ complexity for the inventive dynamic programming algorithm since, typically, signatures are much smaller than the windows themselves and thus $s<<w_{max}$.

The number of sliding windows generated by the previous steps can be quite large—there are for example nearly 1000 64×64 windows at a spacing of 2 pixels in a 128×128 pixel image. The storing of signatures for every sliding window for every image could therefore be prohibitively expensive in terms of both storage and processing costs. One way to reduce this overhead is to cluster the similar windows within an image and store a single representative signature for all of the windows in a cluster.

Since an image may generate a sizeable number of sliding windows, in order to guarantee low response times in the clustering steps 130, 200 of FIG. 1, clustering algorithms with linear time complexity are desired. Most clustering algorithms in the prior art have at least quadratic complexity. Moreover, since it is highly desired to ensure that a cluster contains windows that are fairly alike, it is preferable to be able to specify a threshold on the radius of the cluster, i.e. the maximum distance between the center of the cluster and a point in the cluster. The pre-clustering phase taught in T. Zhang, R. Ramakrishnan, and M. Livny, "Birch: An Efficient Data Clustering Method for Very Large Database," Proceedings of the ACM SIGMOD Conference of Management of Data, pp. 103–114 (June 1996), is expressly incorporated herein by reference (hereinafter referred to as "BIRCH") is a state-of-the-art clustering algorithm for large data sets and meets these requirements. This preclustering phase has time complexity that is linear in the input size and accepts an $\epsilon_c$ parameter that is the threshold on cluster size. It stores a compact summary for each cluster in a CF-tree, which is a balanced tree structure similar to an R*-tree. For each successive data point, it traverses the CF-tree to find the closest cluster and, if the point is within distance $\epsilon_c$ of the cluster, it is absorbed into it; otherwise, it starts a new cluster.

The threshold parameter $\epsilon_c$ and the signatures of all of the sliding windows in an image are presented as inputs to the BIRCH pre-clustering algorithm. BIRCH then generates a set of clusters each, of whose radius is generally within $\epsilon_c$. Depending on the complexity of a given image, the number of clusters will vary. For example, simple uniform images tend to have a lot of similar windows while complex images containing many objects and abrupt color transitions can be expected to have a considerable number of different windows. Thus, the number of clusters generally increases with image complexity.

Each cluster defines a region of the image. Either the centroid or the bounding box of the signatures for windows in the cluster can be used as the signature for the corresponding region. For each region, a bitmap can be computed for the pixels of the image covered by windows in its cluster. This information is utilized in the final step of the similarity metric of the present invention to compute the area of an image covered by multiple matching (and possibly overlapping) regions. For each region, its signature along with its bitmap is stored in an R*-tree which is an efficient disk-based index structure for the storage and retrieval of high-dimensional data points. It should be noted that in the bitmap for a region, it is not necessary to store a bit for each pixel—instead, a coarse representation can be used in which a single bit is kept for each k×k array of pixels, thus decreasing the storage overhead by a factor of $k^2$.

The regions for database images are then preferably stored in a disk-based spatial index. Each region is indexed using either the centroid or the bounding box for signatures in its cluster. Given a query image Q, its regions are extracted using steps identical to those used for the database images. The index is then probed to locate all regions in the database whose signatures are within $\epsilon$ distance of any of the query's regions. Thus, if signatures are bounding rectangles, then the bounding rectangles of regions in the query image are extended by $\epsilon$ and the index is then used to locate all overlapping bounding rectangles therein. Since each bounding rectangle in the index represents a region belonging to an image in the database, this step effectively retrieves all database images that have at least one similar region to that of the query.

The choice of a good spatial index for indexing region signatures is important to the attainable performance of the inventive methods and algorithms. Most proposed methods explode exponentially with dimensionality, eventually reducing to sequential scanning. The R-tree family of multi-dimensional structures is preferred because they are very effective spatial disk-based indexes. R-tree spatial indexes are taught in A. Guttman, "R-trees: A Dynamic Index Structure for Spatial Searching," Proceedings ACM SIGMOD, pp. 47–57 (June 1984), which is expressly incorporated herein by reference. Specifically, the R*-tree spatial index taught in N. Beckman, H. P. Kriegel, R. Schneider and B. Seeger, "The R*-tree: An Efficient and Robust Access Method for Points and Rectangles," Proceedings of ACM SIGMOD, pp. 322–331, (May 1990), which is also expressly incorporated herein by reference, exhibits better performance than other R-tree variants and is preferably used in the inventive methods. Like the R-tree, each internal node in an R*-tree stores a minimum bounding rectangle (MBR) for each of its children and MBRs of siblings are permitted to overlap. Nodes are split when they become full; however, rather than just considering the area, the node splitting heuristic in the R*-tree also minimizes the perimeter and overlap of the MBRs. Furthermore, in order to make the shape of the tree less dependent on the order of insertion, when a node becomes full it is not immediately split but, instead, a portion of the node is reinserted from the top level. Due to these two enhancements, the R*-tree generally outperforms the R-tree.

The quickest similarity metric to compute is one in which a union of the bitmaps is obtained for the matching regions from Q and T, and the area covered by the regions is then computed. The similarity is then the fraction of the total area of the two images that the computed area for the regions represents. This procedure is very fast (linear time complexity in n) and corresponds to relaxing the requirement that each region appear only once in a similar region pair set. A drawback of this approach, however, is that the same query region may match a number of different regions in the target, making the covered area in the target image large since all of the matched regions get included in the computation of area. This may nevertheless not present a problem since very few regions from the query image match regions in the target and, thus, the covered area in the query itself could be small.

The foregoing situation can in any event be remedied by adopting the strict definition of a similar region pair set which restricts the relationship between regions of Q and T to a one-to-one correspondence, i.e. it prohibits a region from appearing multiple times in the similar region pair set. Ideally, it is advantageous to compute the similar region pair set that results in the maximum value for the similarity measure. However, since overlap between regions is permitted, the problem of determining such matching pairs of distinct regions from Q and T that maximize the covered area is a non-trivial problem. Therefore, given matching pairs of regions $(Q_1; T_1) \ldots (Q_n; T_n)$, the problem of computing a similar region pair set with the maximum covered area is denoted as NP-hard.

This can be shown by the following straightforward reduction from the set cover problem, which can be stated as follows: Given elements $e_1, \ldots, e_n$, and sets $L_1, \ldots L_m$, are there k or less sets such that every element e is contained in one of the k sets?

The reduction is carried out by constructing matching regions in Q and R as follows. Consider k non-overlapping windows $Q_1, \ldots Q_k$ in Q, each with a very small area $\delta$. Each $Q_i$ is a separate region of Q. Construct m regions $T_1, \ldots, T_m$ in T, one corresponding to each set $L_i$ as follows. First, for every element $e_i$ there are $n_i$ windows in T, where $n_i$ is the number of sets containing $e_i$. Then, $n_i$ windows corresponding to $e_i$ are arranged in T as follows. First, windows for two distinct elements have no overlap. Second, any pair of windows for the same element have a very large overlap $\geq A$ which is almost equal to the area of the window itself (also A>>$\delta$). Each region $T_i$ is then constructed to contain one window for each element $e_i$ contained in the corresponding set $L_i$—as a result, $T_i$ is the union of $[L_i]$ windows. Finally, every region from Q is allowed to match every region from T.

Thus, there are k or less sets containing every element $e_i$ if and only if there is a similar region pair set with area at least nA. The "only if" part is straightforward—simply choose the regions in T corresponding to the k sets that cover the n elements and, since the windows for elements do not overlap and the window for each element has area of at least A, the area of the similar region pair set is at least nA. For the "if" direction, choose the sets corresponding to the k matching regions from T. If the area covered is greater than nA, then because A is chosen to be very large, it must be the case that a window for each element is contained in the chosen regions in T, and, thus, the sets corresponding to them must contain all of the n elements.

In the following, a "greedy" heuristic is proposed for computing the similar region pair set with the maximum area. The basic idea is to relatively choose the best pair of matching regions that maximizes the area covered by the regions. Let $B_Q$ and $B_T$ be bitmaps maintained for the two images Q and T, respectively, each initially set to zero. Initially, inSet contains the matching pairs of regions from Q and T, $(Q_1; T_1); : : : ; (Q_n; T_n)$, while outSet, into which the similar region pair set is transformed, is empty. The steps of this greedy heuristic are as follows:

1. Add to outSet the pair (Qi; Ti) from inSet for which area $(B_Q \cup Qi)$+area$(B_T \cup Ti)$ is maximum.
2. Delete all pairs containing either $Q_i$ or $T_i$ from inSet. Set $B_Q = B_Q \cup Qi$ and $BT = BT \cup Ti$.
3. If inSet is empty, return outSet; otherwise, return to Step 1.

The time complexity of the greedy algorithm is $O(n^2)$, where n is the number of matching pairs in inSet. The reason for this is that steps 1 and 2 are repeated at most n times, and the complexity of selecting the best matching pair in Step 1 is O(n).

During the image indexing phase, practical considerations force the use of signatures with small sizes, and relatively large $\epsilon_c$ values for the clustering procedure. Smaller signatures reduce the overhead associated with storing keys in indices, and are advantageous since the R-tree family of indices is known to be inefficient for high dimensions. Smaller signatures however, contain less information and, thus, may be less accurate than larger ones. Similarly, a larger value for $\epsilon_c$ results in fewer and larger clusters and, consequently, fewer regions and reduced storage and computation requirements. This also means, however, that windows within a region may be less homogeneous and that the region signatures may be less representative of windows in the region.

These considerations, however, are inapplicable when considering only a single target image T whose similarity measure to Q has already been found to exceed the specified threshold. In this case, even with a smaller $\epsilon_c$ for the clustering phase, the number of regions for T can be expected to be fairly small. As a result, storing larger signatures for each region of T becomes feasible and these signatures will easily fit in main memory. It is therefore possible to perform a refined matching phase in which larger wavelet signatures are recomputed for sliding windows in both Q and T, the windows with a smaller $\epsilon_c$ are clustered, and the region and image matching phases on Q and T are performed as described hereinabove. This refined phase can result in a marked improvement in the quality of the matching process due to more accurate signatures and more homogeneous clusters. If, on the other hand, response time is a significant concern, this refined step of image matching can be selectively omitted.

Figure 5A:
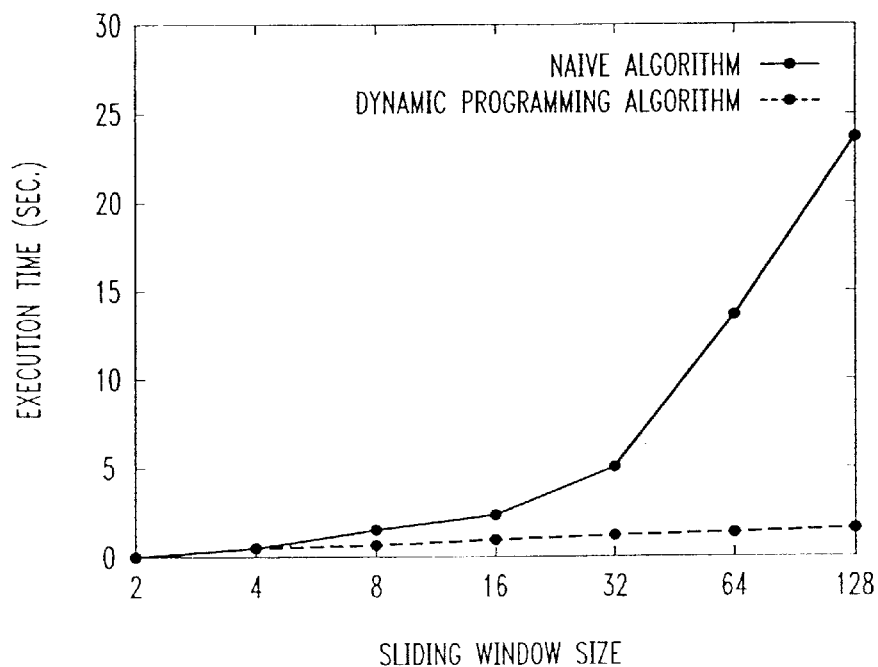
Figure 5B:
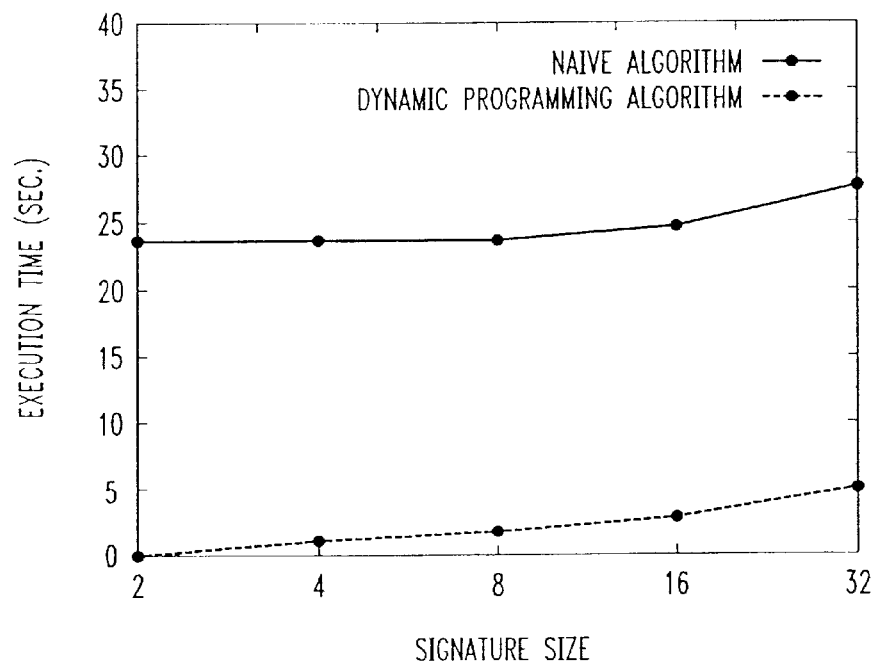

In an effort to experimentally demonstrate the performance benefits gained by the inventive dynamic programming methods herein taught and disclosed for computing wavelet signatures for sliding windows, the execution times were measured for the inventive method and for the "naive" algorithm discussed above. Three important factors that affect the performance of the algorithms are image size, sliding window size and signature size. An exemplary image size is 256×256 and the sliding window size and signature size are varied. The distance between any two adjacent sliding windows is set to be one pixel. FIGS. 5A and 5B, depict the experimentally determined effects of these parameters on computation times. FIG. 5A shows Execution Time (in seconds) against sliding window time, while FIG. 5B shows Execution Time (in seconds) against signature size.

In FIG. 5A the running times of both the inventive and prior art algorithms for computing 2×2 signatures as the sliding window size is varied from 2×2 to 128×128. The numbers $2^i$ along the x-axis represent a window size of $2^i \times 2^i$. Since the sliding window size is always a power of two, the x-axis is shown in log scale. It will be observed that the execution time increases slowly for the inventive dynamic programming algorithm as the window size increases. However, the performance of the "naive" algorithm degrades significantly as the window size grows. The reason for this is that the time complexity of the naive algorithm is proportional to the square of the window size, while the execution time of the inventive dynamic programming algorithm is proportional to the logarithm of window size. For a window size of 128×128, the naive algorithm takes almost 25 seconds to run which is about 17 times slower than the inventive dynamic programming algorithm taught herein.

Similarly, FIG. 5B shows the execution times for the inventive and prior art algorithms as signature size is increased for a fixed sliding window size of 128×128. It can be seen from this graph that the execution time of the dynamic programming algorithm of the present invention increases slowly as signature size is increased, while that of the naive algorithm stays almost constant at 25 seconds. However, even for signatures sized as large 32×32, the inventive dynamic programming algorithm is nearly 5 times faster than the naive algorithm. Since typical signature sizes can be expected to be between 2×2 and 8×8 due to the inability of existing indices to handle high-dimensional data, in most practical situations the inventive dynamic programming algorithm(s) will be far superior to the prior art naive algorithm and, indeed, to most other computationally expensive imaging algorithms.

Thus, the methods of imaging based on wavelet retrieval of scenes as disclosed herein efficiently and effectively compute fixed-size, low-dimensional feature signatures independent of resolution, image size and dithering effects. The inventive methods are computationally inexpensive and can therefore be run on general purpose digital computers. Additionally, the algorithms that implement wavelet retrieval in accordance with the invention are very fast as compared to prior art imaging techniques and are able to differentiate and image objects containing complex colors, textures and shapes, as well as multiple images within an object. Such results have not heretofore been achieved in the art.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method of imaging an object, comprising the steps of:

decomposing a query image of the object into a set of plural regions;

deriving a set of signatures for each region in the set of regions;

defining a similarity measure between the query image and a target image as a function of a fraction of an area of the query and target images covered by matching pairs of regions from the set of regions of the query image and regions in the target image; and extracting the signatures of the set of regions of the query image by grouping in clusters the signatures of the regions having the similarity measure to identify whether the signatures for the regions have related pixel values to regions defined in the target image, to thereby image the object;

wherein said step of decomposing the query image of the object into a set of plural regions comprises the steps of generating for each region of the query image a set of windows having varying sizes of pixel data between a minimum size of pixel data and a maximum size of pixel data, and clustering the generated windows such that ones of the windows that are within a certain distance of others of the windows are clustered together, to thereby define the plural regions in the query image of the object.

2. The method of claim 1, wherein said step of clustering utilizes a linear in time procedure to ensure that the method has low response time.

3. The method of claim 1, wherein said step of deriving comprises applying a wavelet transform to each of the regions of the query image to obtain a series of coefficients for said each region which comprises feature vectors for comparison with feature vectors of the target image to determine whether signatures for the regions of the query image have related pixel data with regions in the target image.

4. The method of claim 3, wherein the wavelet transform comprises a Haar wavelet transform.

5. The method of claim 1, wherein the set of signatures of each region in the set of regions of the query image comprises a centroid constructed from all of the signatures for the each region of the image such that the centroid defines a representative signature for each said region.

6. The method of claim 5, wherein the defined similarity measure determines whether the centroid for each region of the query image is within a constant envelope having a width around the signature of a target image region.

7. The method of claim 1, further comprising the step of indexing a plurality of target images and storing the indexed target images in a database so that target images with similar signature regions are clustered together within a constant envelope having a width.

8. The method recited in claim 7, wherein said step of extracting comprises the steps of clustering together all of the sets of signatures of the plural regions of the query image having a similarity measure within a constant envelope having a width, and comparing the clustered signatures to the target images with similar signature regions to determine whether the clustered signatures of the plural regions of the query image and the target images with similar signature regions have the same similarity measure.

9. A method of matching query images with a target image stored in a library of target images, comprising the steps of:

decomposing a query image into a plurality of regions, to thereby define a set of query regions;

computing a set of signatures for each of the regions in the set of query regions;

clustering the target images into a plurality of target image regions, to thereby define a set of target regions;

computing a set of signatures for each of the regions in the set of target regions;

computing a similarity measure to determine whether the query image and the target image can be matched by identifying a fraction of an area of the query image and of the target image that is covered by matching pairs of regions from the set of query regions and the set of target regions; and comparing the signatures of the query regions with the clustered signatures of the target regions to identify those signatures of the query regions that fall within the computed similarity measure with the clustered signatures of the target regions, and thereby match the query image with the target image;

wherein said step of decomposing comprises generating for each query region a set of windows having varying sizes of pixel data between a minimum size of pixel data and a maximum size of pixel data, and clustering the windows such that those windows that are within a certain distance of others of the windows are clustered together, to thereby define the plural regions in the query image.

10. The method of claim 9, wherein said step of computing comprises applying a wavelet transform to each of the query regions to obtain for the each query regions a series of coefficients comprising feature vectors for said each query region.

11. The method of claim 10, wherein said step of computing further comprises applying the wavelet transform to each of the target regions to obtain for the each target regions a series of coefficients comprising feature vectors that can be compared to the feature vectors for the query regions to determine whether signatures for the query regions have related pixel values with the target regions.

12. The method of claim 11, wherein the wavelet transform comprises a Haar wavelet transform.

13. The method of claim 12, wherein the signatures for the target regions and the query regions comprise centroids constructed from all of the signatures of the target regions and query regions, respectively, such that the centroids define representative signatures for the target and query regions.

14. The method of claim 13, wherein the similarity measure determines whether the centroids of the target and query images are within a constant envelope having a width.

15. The method of claim 14, wherein said step of clustering comprises step indexing the target images and storing the indexed target images in a database so that target images with similar signature regions are clustered together within a constant envelope having a width.

16. The method of claim 9, wherein the decomposing step comprises decomposing the query image into a first set of a plurality of windows having a first size to obtain signatures for each of the windows in the first set, then decomposing the query image into a second set of a plurality of windows having a second size, the second size being larger than the first size, and the obtaining signatures for the plurality of windows in the second set as a function of the signatures of the windows in the first set.

\* \* \* \* \*